(12) United States Patent
Oommen et al.

(10) Patent No.: US 7,925,256 B2
(45) Date of Patent: Apr. 12, 2011

(54) MULTIMODE ROAMING MOBILE DEVICES

(75) Inventors: Paul Oommen, Irving, TX (US); Mitch Tseng, Plano, TX (US)

(73) Assignee: Nokia Corporation, Espoo (FI)

( * ) Notice: Subject to any disclaimer, the term of this patent is extended or adjusted under 35 U.S.C. 154(b) by 451 days.

(21) Appl. No.: 12/010,610

(22) Filed: Jan. 28, 2008

(65) Prior Publication Data

US 2008/0132229 A1    Jun. 5, 2008

Related U.S. Application Data

(63) Continuation of application No. 10/963,629, filed on Oct. 14, 2004, now Pat. No. 7,349,695.

(60) Provisional application No. 60/576,035, filed on Jun. 2, 2004.

(51) Int. Cl.
  *H04Q 7/20* (2006.01)
(52) U.S. Cl. ............... 455/432.1; 455/432.2; 455/550.1; 455/552.1; 455/553.1; 455/422.1; 370/310; 370/329; 370/328
(58) Field of Classification Search ............... 455/432.1, 455/432.2, 550.1, 552.1, 553.1, 422.1, 426.2, 455/426.1, 414.1–414.4, 403, 551, 433; 370/310, 370/329, 328
See application file for complete search history.

(56) References Cited

U.S. PATENT DOCUMENTS

| 5,999,811 | A | 12/1999 | Mölne |
| 6,223,028 | B1 | 4/2001 | Chang et al. |
| 6,415,148 | B1 | 7/2002 | Chiniga et al. |
| 2002/0160763 | A1 | 10/2002 | Mittal et al. |
| 2003/0054809 | A1 | 3/2003 | Bridges et al. |
| 2003/0088539 | A1 | 5/2003 | Andrus et al. |
| 2004/0043788 | A1 | 3/2004 | Mittal |
| 2004/0203745 | A1 | 10/2004 | Cooper |
| 2004/0235475 | A1 | 11/2004 | Ishii |

FOREIGN PATENT DOCUMENTS

| EP | 0 980 190 A1 | 2/2000 |
| WO | WO 01/54435 A1 | 7/2001 |
| WO | WO 02/076131 A1 | 9/2002 |

OTHER PUBLICATIONS

Mazziotto, G., "The Subscriber Identity Module for the European Digital Cellular System GSM", Jun. 26, 1990, pp. 1-9.
OMA Device Management Protocol, version 1.1.2, OMA, Jun. 12, 2009; available at http://www.3gpp2.org/Public_html/specs/C.S0016-0with3Gcover.pdf.
"Over-the-Air Service Provisioning of Mobile Stations in Spread Spectrum Systems," 3rd Generation Partnership Project 2 "3GPP2", Dec. 1999; available at http://www.3gpp2.org/Public_html/specs/C.S0016-0with3Gcover.pdf.
OMA Device Management Protocol, Draft Version 1.2—Dec. 15, 2004, Open Mobile Alliance OMA-DM-Protocol-VI_2_0-20041215-D, (2004), 42 pages.

*Primary Examiner* — Keith T Ferguson
(74) *Attorney, Agent, or Firm* — Alston & Bird LLP

(57) ABSTRACT

A mobile device for roaming between wireless communications networks in different geographical regions is provided. The mobile device includes an interface configured to transmit and receive signals over a wireless channel according to a communication mode using one of a plurality of access technologies. The device also includes a store holding a preferred roaming list having a common block holding data common to the plurality of access technologies, and a set of access technology-specific blocks each holding channel acquisition data specific to one of the plurality of access technologies for setting up the communication mode.

29 Claims, 3 Drawing Sheets

MULTIMODE ROAMING MOBILE DEVICES

CROSS-REFERENCE TO RELATED APPLICATIONS

This application is a Continuation of U.S. patent application Ser. No. 10/963,629, filed Oct. 14, 2004, which in turn claims priority of U.S. Provisional Patent Application No. 60/576,035, filed Jun. 2, 2004. The subject matter of these earlier filed applications are hereby incorporated by reference.

FIELD OF THE INVENTION

This invention relates to multimode roaming mobile devices.

BACKGROUND TO THE INVENTION

Service providers set up roaming agreements with other service providers in different geographic regions so that when the user is in a region where the home service provider does not offer a service, nevertheless the service can be provided by a different service provider who has a billing arrangement with the home service provider. Any particular region may support different systems and networks. For CDMA (Code Division Multiplex Access) networks, a Preferred Roaming List PRL which is stored at the mobile device provides information about which system/network is preferred in the region for that device. Over-the-air (OTA) Management protocols allow data to be transmitted to mobile devices via wireless transmission media. One example of OTA Device Management is the re-programming of the Preferred Roaming List (PRL). When a mobile user is abroad and switches on the mobile device for the first time, the mobile device performs a search for all available networks. The mobile device then reads from the PRL the preferred networks and the order in which they should be offered to the user. Since preferred networks are constantly changing as new roaming agreements are made, it is necessary to frequently update the PRL in the mobile device. This is achieved by downloading the revised PRL remotely using OTA technology. OTA protocols are defined for example in the over-the-air service provisioning/parameter administration (OTASP/OTAPA) and Open Mobile Alliance (OMA) device management standards.

Current protocols developed in OMA (Open Mobile Alliance) DM (Device Management) provide an integrated framework for OTA management of 3G mobile devices. The existing OMA DM protocol defines a management framework and a set of messages exchanged between one mobile device and an entity in the network called the management server. A management session is set up between the management server and the mobile device, and an OTA message is constructed which is unique to the mobile device.

FIG. 1 illustrates the structure of a preferred roaming list PRL for CDMA networks. There is a system table $ST_1 \ldots ST_i \ldots ST_n$ associated with each geographical region which contains a list of system descriptions keyed by system identifier/network identifier (SIN/NID) pairs and associated with an acquisition index. The acquisition index is used as a pointer to an acquisition table AT which contains an indexed list of RF channels for channel acquisition purposes in the new network.

According to the current standard, system acquisition can be carried out using frequency blocks with Personal Communication Systems (PCS) assigned values, or by using channel numbers with the highest priority channel first.

To date preferred roaming lists are provided only in the context of CDMA operation, which includes system selection in analogue mode and CDMA mode.

Currently, for GSM mobile equipment, a list of preferred Public Land Mobile Networks (PLMNs) is stored in the Subscriber Identity Module (SIM) of the mobile device. This enables roaming through PLMN selection when the mobile equipment is outside the home network. However, a GSM mobile device would have no information about a CDMA network in its geographical region or vice-versa.

So-called multimode devices are currently being developed which should be capable of roaming in heterogeneous network environments. For example, a device originally provisioned in a CDMA network should be capable of roaming in a GSM, WLAN (Wide Local Area Network), UMTS (Universal Mobile Telecommunications Systems) or any other network.

SUMMARY OF THE INVENTION

It is an aim of the invention to enable selection of preferred access technology in a geographical region for multimode mobile devices and to improve OTA management of preferred roaming lists for differing access technologies.

According to one aspect of the invention there is provided a mobile device for roaming between wireless communications networks in different geographical regions, the mobile device comprising: an interface adapted to transmit and receive signals over a wireless channel according to a communication mode using one of a plurality of access technologies; and a store holding a preferred roaming list having a common block holding data common to said plurality of access technologies, and a set of access technology-specific blocks each holding channel acquisition data specific to one of the plurality of access technologies for setting up said communication mode.

Another aspect of the invention provides a method of selecting a communication mode for a mobile device roaming between wireless communications networks in different geographical regions, the method comprising the steps of: receiving network parameters identifying wireless communications networks in the region where the mobile device is located; comparing said parameters with preferences among a plurality of access technologies and selecting one of said access technologies; and scanning channel acquisition data for the selected access technology to set up a communication mode using the selected access technology.

A further aspect of the invention provides a method of managing a preferred roaming list of a mobile device capable of transmitting and receiving signals using each of a plurality of access technologies, the method comprising: transmitting a notification message from a mobile device to a management server, said notification message including parameters identifying the device and the access technology of a current communication mode; and transmitting an update message from the management server to the mobile device according to said communication mode, for performing an update to access technology-specific blocks of a preferred roaming list stored at the mobile device.

A further aspect of the invention provides a computer program product comprising a code sequence which, when executed by a processor in a mobile device, carries out the following steps: receiving network parameters identifying wireless communications networks in the region where the mobile device is located; comparing said parameters with preferences among a plurality of access technologies and selecting one of said access technologies; and scanning channel acquisition data for the selected access technology to set up a communication mode using the selected access technology.

A further aspect of the invention provides a method of managing a preferred roaming list of a mobile device capable of transmitting and receiving signals using each of a plurality of access technologies, the method comprising: transmitting a notification message from a mobile device to a management server, said notification message including parameters identifying the device and the access technology of a current communication mode; and transmitting an update message from the management server to the mobile device according to said communication mode, for performing an update to a preferred roaming list stored at the mobile device, said update message indicating whether it is performing an update to a common block of the preferred roaming list holding data common to said plurality of access technologies or performing an update to access technology-specific blocks of the preferred roaming list.

Another aspect of the invention provides [claim 28]

In a possible embodiment of the invention, a common data block carrying data related to roaming in different networks (CDMA, GSM, WLAN, and future networks) is linked to preferred roaming lists for each network access system.

In a possible embodiment of the invention, preferred roaming lists for each access system as well as the common data block can be stored in the R-UIM or SIM card.

In a possible embodiment of the invention, preferred roaming lists for each access system as well as the common data block can be stored in the mobile equipment.

In a possible embodiment of the invention, the common data block stores access level information, enabling the mobile station to decide which access system is preferred in a given geographical region. E.g. to decide whether CDMA or GSM is preferred in a region.

In a possible embodiment of the invention, the common data block stores parameters related to accessing the management station, as well as security parameters.

In a possible embodiment of the invention, there may be a common identity parameter, which can identify the mobile station in each access network.

In a possible embodiment of the invention, the common data block stores parameters related to identity of the mobile station, such as a common identity that can be used in all networks. Currently we have ESN (Electronic Serial Number), MEID (Mobile Equipment Identifier) etc. in CDMA, and IMEI (International Mobile Equipment Identity) in GSM for equipment id. There can be a future id common to all access system or a common id designed for the purpose of multi-mode roaming. Such an id can be stored in the common block.

In a possible embodiment of the invention, the preferred roaming lists linked to the common data block stores information specific to each radio network. For example, there is a preferred list that stores preferences of system and channel for operation in CDMA mode, another one for storing preference list of systems and channels in GSM network and another similar list for WLAN.

In a possible embodiment of the invention, there can be such preferred lists for future access technologies.

In a possible embodiment of the invention, the common data block and various preferred lists may be represented and implemented using a hierarchical tree which is implemented in the mobile station and stored either in the mobile equipment (ME) or the R-UIM/SIM card. The hierarchical tree is used for over-the-air management purpose, especially when OMA DM and similar protocols are used for managing multi-mode roaming data.

In a possible embodiment of the invention, the common data block carries pointers to or the address of location in the R-UIM/SIM or the hierarchical tree where the actual preferred list for a specific access system is stored. For example, the mobile station radio software can use this information to access the preferred list and select a system in a region.

In a possible embodiment of the invention, the common data block and the different preferred lists could be created and updated in the mobile station using over-the-air methods.

In a possible embodiment of the invention, the common data block and different preferred lists can be retrieved from the mobile station using over-the-air method.

In a possible embodiment of the invention, the retrieval can be based on algorithms of tree encoding and compression.

In a possible embodiment of the invention, over-the-air method can be based on the OMA DM protocol.

In a possible embodiment of the invention, over-the-air method can be based on the IOTA-HCM (Handset Configuration Management) protocol, described in GPP2 C.S0040-0 v1.0.

In a possible embodiment of the invention, over-the-air method can be based on the OTASP/OTAPA protocol.

In a possible embodiment of the invention, over-the-air method can be based on pure air-interface messaging.

In a possible embodiment of the invention, the information created or updated or retrieved from the mobile station can be stored in a network location, associated with the management station.

In a possible embodiment of the invention, the information stored in the network location can be sent to another network, to a management station in that network.

In a possible embodiment of the invention, the information sent to another network can be created and updated in a mobile station of the same user in that network. As an example, a user visits a new network, and he lost his mobile station afterwards, this mechanism helps creating and updating roaming related data in the new mobile station.

In a possible embodiment of the invention, in order to have control of managing preferred lists in the mobile station, the mobile station stores a 'current mode' parameter value and sends it to the management station. The management station uses this information to update the correct Preferred Roaming List.

In a possible embodiment of the invention, a management station associated with a network can update also preferred lists corresponding to other access networks. For example the security parameters in the common data block can be set to allow this. This allows a management station in the GSM network to update also CDMA preferred lists.

For a better understanding of the present invention and to show how the same may be carried into effect, reference will now be made by way of example to the accompanying drawings.

DESCRIPTION OF THE PREFERRED EMBODIMENTS

Figure 1:
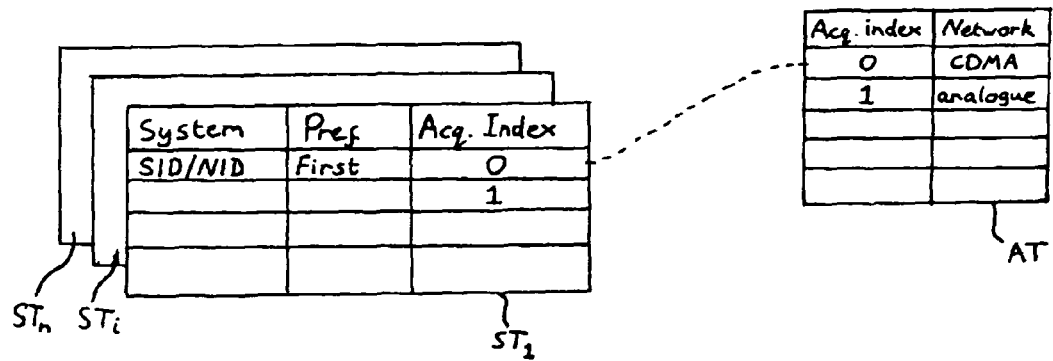
FIG. 1 is a schematic diagram of an existing preferred roaming list.
Figure 2:
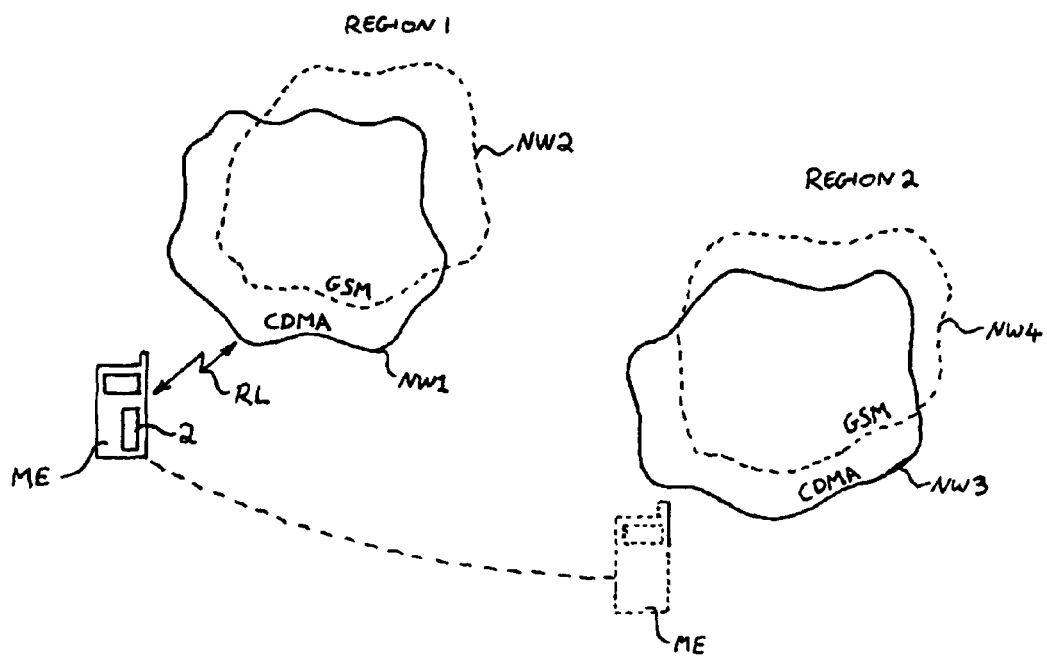
FIG. 2 is a schematic diagram illustrating a roaming mobile device.

FIG. 2 is a schematic diagram illustrating the principle of a user roaming between networks. A mobile device is referred to in the following as a mobile equipment ME and is illustrated located in a first region, Region 1 and in communication with a first network NW1 over a radio link RL. As is well know, the radio link constitutes a physical signalling channel over the air interface between the mobile equipment ME and the network. In this case, the network that the mobile equipment ME is in communication with is a CDMA (Code Division Multiplex Access) network, and the communication mode for the radio link is CDMA. However, the Region 1 also supports a second network NW2, which in the illustrated case is a GSM network. So-called multimode mobile devices can operate using different access technologies such as CDMA, GSM, WLAN, UMTS etc. To this end, they are provided with a wireless interface for receiving and transmitting signals according to each of a plurality of different access technologies supported by appropriate client software operating in the mobile equipment. Different geographical regions can provide one or more networks or systems of different access technologies, though in any particular region it is likely that one of the networks or systems will be preferred.

When the mobile equipment ME moves to a second region, Region 2, that region similarly provides more than one network with different access technologies (NW3-CDMA, NW4-GSM). In Region 2, the mobile equipment ME needs to determine which would be the preferred access technology for that particular region.

As is well known, the mobile equipment includes a memory 2. Amongst other things, the memory 2 stores a preferred roaming list PRL. In some types of mobile equipment ME, a replaceable user identity module (R-UIM) is used to store the preferred roaming list PRL instead of the memory 2. Although in many cases the mobile equipment is a mobile telephone, it will be appreciated that other types of mobile equipment can be utilised, in particular a mobile computer.

Figure 3:
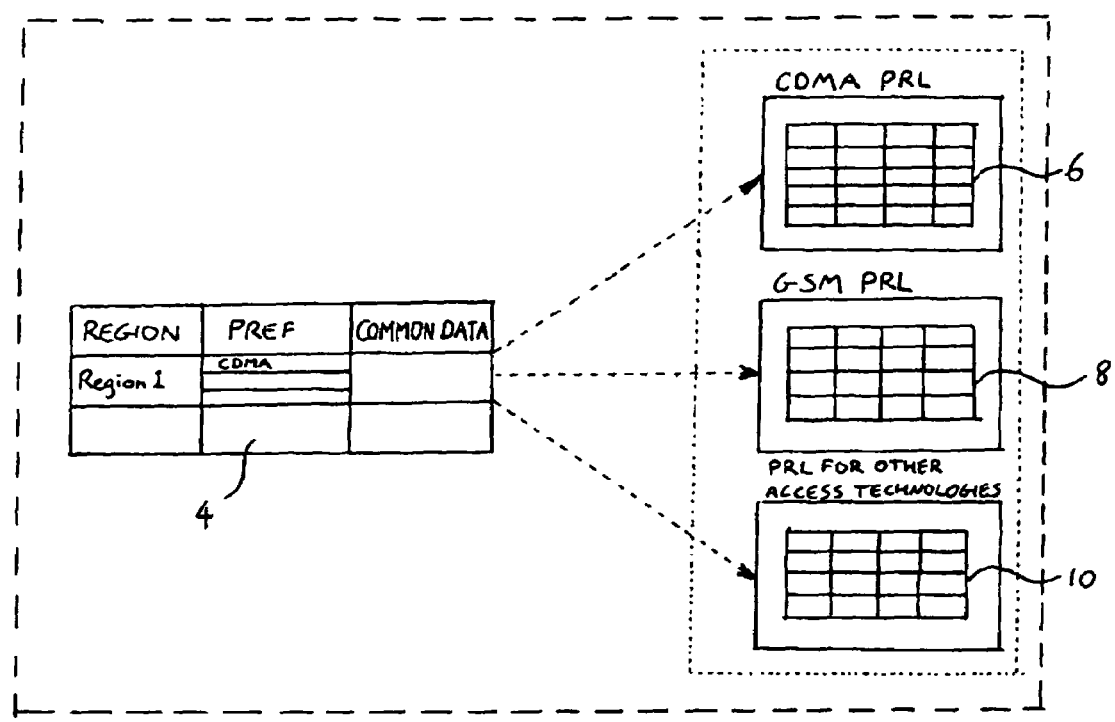
FIG. 3 is a schematic diagram illustrating a preferred roaming list in accordance with one embodiment of the invention.

FIG. 3 illustrates the structure of the preferred roaming list which is stored at the mobile equipment ME. The preferred roaming list PRL illustrated in FIG. 3 has a common PRL data block 4 which stores preferences regarding which access technology and system is preferred in a given region. For example, the common PRL data block 4 can include preferences for geographical regions, for example CDMA can be the first preference for the first region Region 1. The common PRL block 4 can also store any other parameters common to the different access technologies. Such parameters can include, for example, location of the provisioning server or security parameters.

The PRL illustrated in FIG. 3 also has a set of access technology specific PRL blocks including a CDMA PRL block 6, a GSM PRL block 8, and a PRL block 10 for other access technologies. The common PRL data block 4 includes pointers to these blocks from the access technologies identified for particular regions. Each of the individual access technology specific blocks 6, 8, 10 includes channel acquisition data for use by the mobile equipment ME in setting up a radio link for communication in that particular region via the selected access technology.

When a user roams between networks, the mobile equipment ME can look in the common PRL data block 4 to identify if there is a preferred access technology and system in the new region in which it has arrived. Consider in FIG. 4, the mobile equipment ME arriving in the second region Region 2 where the CDMA network NW3 causes a base station BTS2 to transmit a broadcast message 20 identifying the system and network parameters to all users in the region; in the case of CDMA these are SID/NID pairs for the available CDMA systems. The mobile equipment compares this with data in the common PRL data block 4 and identifies the preferred access technology and system. This comparison is done by appropriate client software at the mobile equipment ME1. Using the pointer to the access technology specific PRL block for the preferred access technology, the mobile equipment ME can access the PRL corresponding to the preferred access technology, and can then scan that PRL block for channel acquisition. This is faster than using a single large preferred roaming list which combines parameters for all of the possible access technologies. In GSM networks, the base station transmits beacon frequencies, and the mobile equipment compares the signal strength of any beacon frequencies listed in the common PRL block 4 to locate the preferred GSM system, in the case that GSM is preferred or no CDMA network is available.

Initial provisioning of the PRL in the home network can be done using Internet Protocol (IP) based over-the-air device management (IOTA-DM) or over-the-air service provisioning/parameter administration (OTASP/OTAPA) protocols, depending on the chosen method and in particular whether the data is to be supplied via an IP-based protocol in data bursts or using pure air-interface signalling in the home network. Alternatively, initial provisioning can be implemented through the manufacturing or distribution process by placing roaming information and parameters onto devices such as SIM cards or R-UIMs at the time of manufacture. At the time of the initial provisioning, common parameters are stored in the common data PRL block 4 so that these parameters (related to the roaming list in multimode operation) can be accessed regardless of the access technology.

Management of the preferred roaming list PRL is carried out in the following way. Effective roaming requires up-to-date management of the PRLs when carrier and user preferences change.

Management of roaming lists is effected using a management server (MS) in the network.

Figure 4:
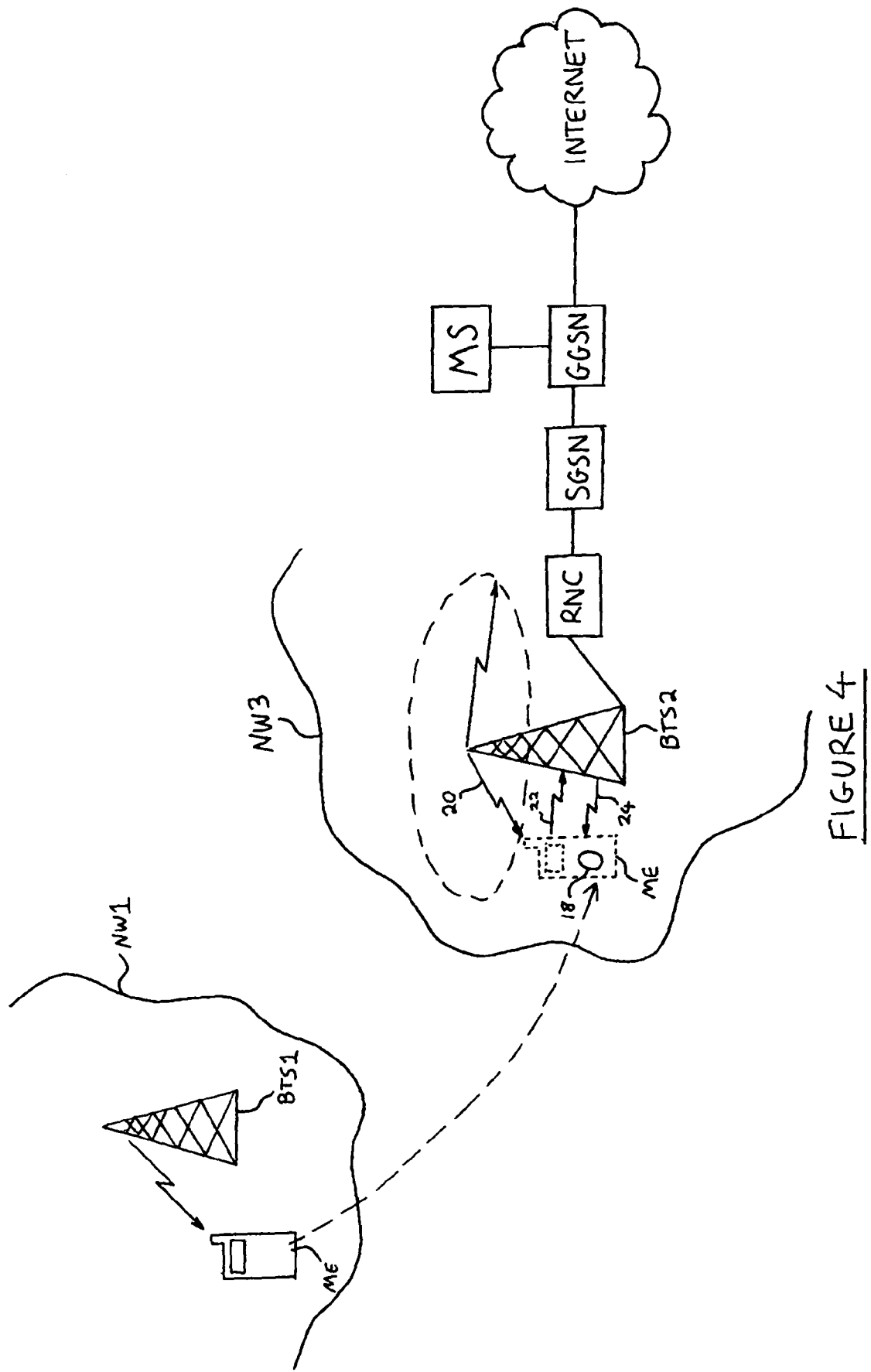
FIG. 4 is a schematic diagram illustrating use and updating of the preferred roaming list in a roaming mobile device.

As explained above, the PRL initially provisioned in the home network enables the mobile equipment ME to select a preferred access technology for the region where it is located. After the preferred access technology has been selected, a device information tree at the mobile equipment ME is updated with the "current mode" parameter cmp. As illustrated in FIG. 4, a notification message 22 is sent according to a communication mode using the selected access technology from an OTA management client 18 in the mobile equipment ME to the management server MS in the geographical region where the mobile equipment is now located, the notification message 22 including current mode parameters <cmp> and other parameters identifying the user/equipment identity and subscribed service of the specific user. Based on this information, the management server MS sends an update message 24 back to the mobile equipment to update the preferred roaming list stored in the memory 2.

FIG. 4 shows schematically part of the architecture of a UMTS (Universal Mobile Telecommunications Network). This shows an RNC (Radio Network Controller); an SGSN (Serving GPRS Support Node); a GGSN (Gateway GPRS Support Node); a management server (MS); and the Internet. In FIG. 4 the management server MS is directly connected to an operator's GPRS domain via the GGSN. In an alternative embodiment, the management server may be connected to an operator's GGSN through the Internet.

It will be understood that the security mechanisms which are defined in the existing protocol for over-the-air device management needs to be applied to ensure the authenticities of the updated information and the rights of the user. The update message 24 transmitted from the management server MS to the mobile equipment ME relates to the access technology specific PRL block which is associated with the access technology identified by the common mode parameter cmp which was identified in the original notification message.

It is also possible for the update message to update an access specific technology PRL block for a different access technology than the one in which the mobile equipment ME is currently operating. For example, the management server can update the PRL corresponding to the GSM mode when the mobile is operating in a CDMA mode, provided that there are suitable access restrictions and authentication procedures in place. If the over-the-air management is done using the OMA device management protocol, the preferred roaming lists can be abstracted using a management tree and appropriate access restrictions defined for each.

The common part can be updated by the management server when there are changes in the priorities of access system selection, security parameters, information about the management server itself etc. In these cases, the management server can trigger an updating session.

What is claimed is:

1. An apparatus comprising at least one processor and at least one memory including computer program code, the at least one memory and the computer program code configured to, with the at least one processor, direct the apparatus at least to:
    cause signals to be transmitted and received over a wireless channel according to a communication mode using one of a plurality of access technologies;
    cause storage of a preferred list having a common block holding data common to said plurality of access technologies, and a set of access technology-specific blocks, each set of access technology-specific blocks configured to hold channel acquisition data specific to only one of the plurality of access technologies,
    wherein the apparatus is configured to move between wireless communications networks in different geographical regions.

2. The apparatus according to claim 1, wherein said data of the common block comprises access level information indicating preferred access technologies associated with different geographical regions.

3. The apparatus according to claim 2, wherein the apparatus is further directed to compare network parameters received in broadcast messages from the wireless communication networks in a region where the apparatus is located with the access level information to select one of said plurality of access technologies for said communication mode.

4. The apparatus according to claim 1, wherein the common block includes a set of pointers identifying respective ones of the set of access technology-specific blocks.

5. The apparatus according to claim 1, wherein the apparatus directed to cause storage of the preferred list includes being directed to cause storage of the preferred list in a memory.

6. The apparatus according to claim 1, wherein the apparatus directed to cause storage of the preferred list includes being directed to cause storage of the preferred list in a removable user identity module.

7. The apparatus according to claim 1, wherein the apparatus directed to cause storage of the preferred list includes being directed to cause storage of the preferred list in a subscriber identity module.

8. The apparatus according to claim 1, wherein the data of the common block comprises parameters relating to accessing a management station for a region where the apparatus is located.

9. The apparatus according to claim 1, wherein the data of the common block comprises security parameters.

10. The apparatus according to claim 1, wherein the data of the common block comprises a common identity parameter that identifies the apparatus in each of the wireless communications networks.

11. The apparatus according to claim 1, wherein the apparatus directed to cause storage includes being directed to cause storage of the common block and access technology-specific blocks in a form of a hierarchical tree.

12. A method comprising:
    managing a preferred list of a mobile device configured to cause signals to be transmitted and received using each of a plurality of access technologies;
    causing a notification message to be transmitted from a mobile device to a management server, said notification message including parameters identifying the mobile device and an access technology of a current communication mode;
    receiving an update message from the management server at the mobile device according to said communication mode; and
    updating, in response to at least the update message, only one access technology-specific block of a preferred list stored at the mobile device, the access technology-specific block being one of a set of access technology-specific blocks, each holding channel acquisition data specific to one of the plurality of access technologies.

13. The method according to claim 12, further comprising:
    updating the access technology-specific block to relate to the access technology of the current communication mode.

14. The method according to claim 12, further comprising:
    configuring the update to the access technology-specific block to relate to an access technology other than the one which is being used for the current communication mode.

15. The method according to claim 12, wherein causing the notification message to be transmitted and receiving the update message comprise causing the notification message to be transmitted over a wireless interface and receiving the update message over a wireless interface.

16. The method according to claim 12, further comprising:
    causing the preferred list to be provided by the mobile device over a wireless interface.

17. The method according to claim 16, further comprising:
    causing the preferred list to be provided from the mobile device over the wireless interface based on algorithms of tree encoding and compression.

18. The method according to claim 16, further comprising:
    causing the preferred list retrieved from the mobile device to be stored at a network location associated with the management server.

19. The method according to claim 18, further comprising:
    causing the preferred list to be transmitted from the management server to a remote management server in a different network.

20. The method according to claim 19, further comprising: receiving the preferred list from the remote management server at the mobile device in said different network.

21. The method according to claim 12, further comprising: causing the notification message to be transmitted and receiving update message according to open mobile alliance device management protocol.

22. The method according to claim 12, further comprising: causing the notification message to be transmitted and receiving the update message based on interne protocol over-the-air-HCM protocol.

23. The method according to claim 12, further comprising: causing the notification message to be transmitted and receiving the update message based on over-the-air service provisioning/parameter administration protocol.

24. The method according to claim 12, further comprising: causing the notification message transmitted and receiving the update message based on air interface messaging.

25. A computer program product comprising a computer program code which, when executed by a processor, directs an apparatus to: cause a notification message to be transmitted from a mobile device to a management server in a network, said notification message including parameters identifying the mobile device and an access technology of a current communication mode;
receiving an update message from the management server; and
performing an update to only one access technology-specific block of a preferred list, the access technology-specific block being one of a set of access technology-specific blocks each holding channel acquisition data specific to one of a plurality of access technologies.

26. A system comprising a management server, the management server comprising:
means for receiving a notification message from a mobile device, said notification message including parameters identifying the mobile device and an access technology of a current communication mode; and
means for causing an update message to be transmitted for performing an update to only one access technology-specific block of a preferred list stored at the mobile device, the access technology-specific block being one of a set of access technology-specific blocks each holding channel acquisition data specific to one of a plurality of access technologies.

27. An apparatus comprising:
means for causing signals to be transmitted and received using each of a plurality of access technologies;
means for causing a notification message to be transmitted to a management server, said notification message including parameters identifying the device and an access technology of a current communication mode;
means for receiving an update message from the management server according to said communication mode; and
means for updating only one access technology-specific block of a preferred list, the access technology-specific block being one of a set of access technology-specific blocks, each holding channel acquisition data specific to one of the plurality of access technologies.

28. An apparatus comprising at least one processor and at least one memory including computer program code, the at least one memory and the computer program code configured to, with the at least one processor, direct the apparatus:
manage a preferred list of a mobile device configured to cause signals to be transmitted and received using each of a plurality of access technologies;
cause a notification message to be transmitted from a mobile device to a management server, said notification message including parameters identifying the mobile device and an access technology of a current communication mode;
receive an update message from the management server at the mobile device according to said communication mode; and
update, in response to at least the update message, only one access technology-specific block of a preferred list stored at the mobile device, the access technology-specific block being one of a set of access technology-specific blocks, each holding channel acquisition data specific to one of the plurality of access technologies.

29. A method comprising:
receiving a notification message from a mobile device, said notification message including parameters identifying the mobile device and an access technology of a current communication mode; and
causing an update message to be transmitted for performing an update to only one access technology-specific block of a preferred list stored at the mobile device, the access technology-specific block being one of a set of access technology-specific blocks each holding channel acquisition data specific to one of a plurality of access technologies.

* * * * *